(12) United States Patent
Ringel

(10) Patent No.: US 8,153,327 B2
(45) Date of Patent: Apr. 10, 2012

(54) INTERCONNECTOR FOR HIGH TEMPERATURE FUEL CELLS

(75) Inventor: Helmut Ringel, Niederzier (DE)

(73) Assignee: Forschungszentrum Juelich GmbH, Juelich (DE)

( * ) Notice: Subject to any disclaimer, the term of this patent is extended or adjusted under 35 U.S.C. 154(b) by 906 days.

(21) Appl. No.: 11/887,154

(22) PCT Filed: Feb. 16, 2006

(86) PCT No.: PCT/DE2006/000277
§ 371 (c)(1),
(2), (4) Date: Sep. 24, 2007

(87) PCT Pub. No.: WO2006/099830
PCT Pub. Date: Sep. 28, 2006

(65) Prior Publication Data
US 2009/0061300 A1    Mar. 5, 2009

(30) Foreign Application Priority Data

Mar. 23, 2005  (DE) .......................... 10 2005 014 077

(51) Int. Cl.
*H01M 2/20*        (2006.01)
(52) U.S. Cl. ....................................................... 429/468
(58) Field of Classification Search .................. 429/457, 429/467–469
See application file for complete search history.

(56) References Cited

U.S. PATENT DOCUMENTS

| 5,733,682 | A | 3/1998 | Quadakkers |
| 7,222,406 | B2 * | 5/2007 | Chou et al. ...................... 29/434 |
| 7,833,678 | B2 * | 11/2010 | Inagaki .......................... 429/511 |
| 2004/0101742 | A1 * | 5/2004 | Simpkins et al. ............... 429/44 |
| 2005/0136312 | A1 * | 6/2005 | Bourgeois et al. ............. 429/32 |
| 2006/0121334 | A1 | 6/2006 | Finkenwirth |

FOREIGN PATENT DOCUMENTS

| CA | 2415391 A | 1/2008 |
| DE | 4016157 A | 12/1990 |
| DE | 44 30 958 | 10/1995 |
| DE | 195 31 852 | 12/1996 |
| DE | 1033898 A | 1/2002 |
| DE | 10317388 A | 11/2004 |
| EP | 0446680 A | 9/1991 |
| WO | 0101981 A | 1/2001 |

* cited by examiner

*Primary Examiner* — Ula C. Ruddock
*Assistant Examiner* — Thomas H. Parsons
(74) *Attorney, Agent, or Firm* — Andrew Wilford

(57) ABSTRACT

In a high-temperature fuel cell at least one electroconductive agent is provided for contacting an anode with an interconnector. Side edges of the interconnector are electrically connected with the anode by the electroconductive agent. Electrically nonconductive spring-loaded elements are provided between the anode and the interconnector for permitting relative movement therebetween.

8 Claims, 2 Drawing Sheets

INTERCONNECTOR FOR HIGH TEMPERATURE FUEL CELLS

CROSS REFERENCE TO RELATED APPLICATIONS

This application is the US national phase of PCT application PCT/DE2006/000277, filed 16 Feb. 2006, published 27 Sep. 2006 as WO 2006/099830, and claiming the priority of German patent application 102005014077.7 itself filed 23 Mar. 2005, whose entire disclosures are herewith incorporated by reference.

FIELD OF THE INVENTION

The invention relates to an interconnector for high temperature fuel cells.

BACKGROUND OF THE INVENTION

A fuel cell has a cathode, an electrolyte, and an anode. An oxidation agent, for example air, is fed to the cathode, and a fuel, for example hydrogen, is fed to the anode.

Various types of fuel cells are known, such as the SOFC fuel cell from the published patent DE 44 30 958 C1, as well as the PEM fuel cell from the published patent DE 195 31 852 C1.

The SOFC fuel cell is also called a high-temperature fuel cell, since its operating temperature can reach up to 1000° C. On the cathode of a high-temperature fuel cell, oxygen ions are formed in the presence of the oxidation agent. The oxygen ions are diffused through the electrolyte and recombine into water on the anode side with the hydrogen deriving from the fuel. During recombination, electrons are released, producing electric energy.

Typically, in order to achieve a high electric output, several fuel cells are electrically and mechanically connected to each other by means of connecting elements, also known as interconnectors. These interconnectors form fuel cells that are stacked on top of each other and electrically connected in series. This arrangement is called a fuel-cell stack. The fuel-cell stacks are comprised of the interconnectors and the electrode-electrolyte units.

In addition to their electrical and mechanical properties, interconnectors regularly also have gas distribution structures. This is accomplished by means of ridges and grooves (DE 44 10 711 C1 [U.S. Pat. No. 5,733,682]). Gas-distribution structures have the effect that the operating agents are evenly distributed in the electrode spaces (spaces where the electrodes are located).

The disadvantage with fuel cells and fuel-cell stacks is that the following problems can occur:

metallic interconnectors having a high aluminum content form $Al_2O_3$ cover layers which disadvantageously act like an electrical insulator.

during a cyclical temperature load, heat tensions generally occur in connection with the relative movements of the individual components; these are a result of the different expansion behavior and/or the different expansion coefficients of the materials used during the operation.

In this regard, the state of the art does not yet provide for sufficient compatibility between the comparatively high expansion coefficients of the metallic interconnector and the current electrode materials, for example, whose expansion coefficients are comparatively small. On the one hand, heat tensions can occur between electrodes and interconnectors and can cause destruction within the fuel cell. On the other hand, this can also relate to the glass solders that are frequently used in fuel cells and are supposed to ensure the impermeability of the fuel cells. During the joining process, the fuel-cell stack is heated to approximately 700-900° C. and pressed together at 1-5 kN. This causes the glass solder to soften, so that the joining pressure not only causes gaps between the cells, the interconnectors, and the housing to be sealed, but at the same time results in a contact pressure to create an electrical contact between the cells and the interconnectors.

A disadvantage in this arrangement is that the glass solder crystallizes after only a few hours of operation and becomes brittle and hard. Its elastic properties are lost. As a result, the contact pressure acting on the outside of the stack is distributed over the outer sealing force and the inner contact force in an irregular and uncontrolled fashion. Moreover, when the fuel-cell stack is operated at 700-900° C. for an extended period of time, creeping occurs in the various layers of stack materials, and particularly shrinking in the initially unsintered cathode contact layer. This makes it impossible to maintain a reliable contact force between the cells and interconnectors, and the electrical contact is lost. The fuel cell is no longer functional.

OBJECT OF THE INVENTION

It is therefore an object of the invention to provide an interconnector for a high-temperature fuel cell that ensures a mechanical and electrical contact between the anode and the interconnector that is stable over the long term.

SUMMARY OF THE INVENTION

This problem is solved by an interconnector for a high-temperature fuel cell characterized by an interconnector whose side edges are in electroconductive contact with the anode by means of an electroconductive agent, and whose anode is accommodated in the interconnector by means of spring-loaded elements. This interconnector design makes it possible to decouple of the sealing and contact forces. While according to the current state of the art, an electroconductive agent, for example, was responsible both for an electrically stable contact and a stable mechanical contact and seal, the present invention now distributes this task to two devices: spring-loaded elements that ensure the stable mechanical contact and sealing of the fuel cell, and an electroconductive agent that is in contact with the anode via the side edges of the interconnector and thus ensures a stable electrical contact. The spring-loaded elements no longer need to transmit electricity. In contrast to the state of the art, the electric current no longer flows directly vertically between the anode and the interconnector, but it is rather redirected over the side edges of the interconnector.

In an advantageous embodiment of the device, the spring-loaded elements comprise, for example, individual elements having a diameter in the form of a circle, a C, or an S, or of a spring-loaded layer or spring-loaded strips. This spring-loaded layer or the strips can consist of mica, for example. Mica is described as a group in the oblique crystal system of crystallizing silicate minerals having the complex chemical composition of (K,Na,CA) (Al,Mg,Fe,Li) 2-3 (OH) 2 (Si,Al) 4-5O10. The atoms in parenthesis may be present in any combination, although they always maintain the same relationship with the other atom groups (Wikipedia Free Encyclopedia). The individual elements that are shaped like a circle, a C or an S can, for example, be comprised of steel pipes having high-temperature stability, profile bars or sheet metal. The individual spring-loaded elements can be 1-2 mm high to ensure sufficient springiness and to compensate for relative movements. Since the stiffness of the individual spring-loaded elements can be freely chosen, the contact force can be set exactly as required. While mica is less springy than the circular, C- or S-shaped elements, it has higher temperature stability and is less expensive. Within the group of individual circular, C- or S-shaped elements, the circular elements are stiffer than the elements of C- or S-shape.

An advantageous embodiment of the device has an electroconductive agent of nickel, gold, platinum or silver. This allows for the use of a nickel mesh, for example, that has a wire size of 0.6 mm and a wire spacing of 2.6 mm. Thin sheet metal or foil made of the appropriate material may also be used. The electroconductive agents can be electroconductively connected to the side edges of the interconnector by, for example, high-temperature soldering or welding, or they can be fitted into prefabricated grooves at the edges of the interconnector or soldered into place there.

In a further advantageous embodiment of the device, the interior glass solder seal is connected to the adjoining interconnector by means of a spring-loaded element. This allows bending stresses that occur at the edges of the fuel cell to be reduced, thus preventing the fuel cell from rupturing. This spring-loaded element can, for example, be an aluminum-chrome strip that is shaped like a circle, a C, or an S.

Alternatively to the glass solder seals until now in use between the individual interconnectors, metallic seals can also be used; these are not electrically insulated and can compensate for relative movements at the edges of the interconnectors that are connected to each other. This is made possible because, owing to the appropriate dimensioning of the spring-loaded elements, the great forces that act on the metallic seal are no longer directed to the fuel cell in an uncontrolled fashion, but the contact force can be defined based on the freely controllable rigidity of the spring-loaded elements. The metallic seal can be electrically insulated by means of a ceramic layer on the interconnector edge or by coating the metallic seal with a layer of ceramic (such as a zirconium oxide layer).

The problem is additionally solved by a method of making the interconnector described in this invention.

BRIEF DESCRIPTION OF THE DRAWING

In the following, the invention will, among others, be explained by means of the description of an embodiment and by reference to the attached drawing.

DETAILED DESCRIPTION

Figure 1:
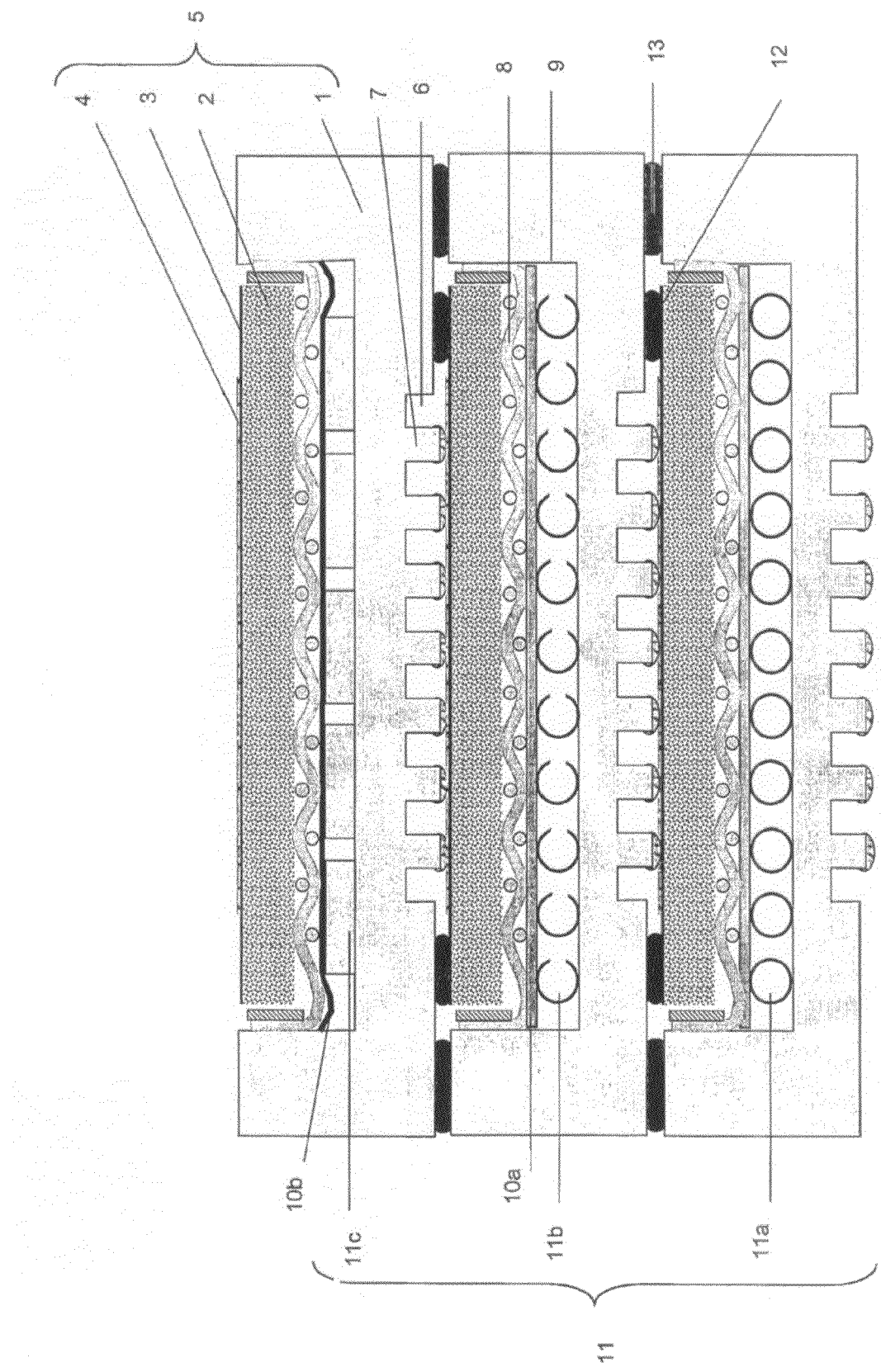
FIG. 1 shows a schematic cross-section through a stack of fuel cells that are connected to each other by means of the interconnectors 1 described in this invention.

FIG. 1 shows a schematic cross-section through three fuel cells 5, each comprising an anode 2, cathode 4, and electrolyte 3 that are connected to each other by means of interconnectors 1 according to the invention. The interconnectors contain gas grooves 6 and ridges 7. Below the anode 2, an electroconductive agent 8 is arranged that is electroconductively connected to the side edges 9 of the interconnector 1. Between the interconnector 1 and the electroconductive agent 8, are the spring-loaded elements 11 comprising the individual elements 11a, 11b, 11c. The cross-section thereof can, for example, be circular 11a or C-shaped 11b, or they can consist of a layer/strip of mica 11c. To produce a flat plane and to distribute the springy effect evenly, the individual spring-loaded elements 11a, 11b, 11c can be connected to a piece of sheet metal 10a, 10b. The sheet metal 10a, 10b can be connected to the interconnector 1 either floating freely 10a or rigidly 10b. To provide for a gas-tight seal for the gaps between the fuel cell 5 and the interconnectors 1, for example, glass ceramic such as glass solder is employed. The cathode space can be sealed against the anode space by means of an interior glass solder seal 12. To seal the gaps between the interconnectors 1, an external glass solder seal 13 may be used.

Figure 2:
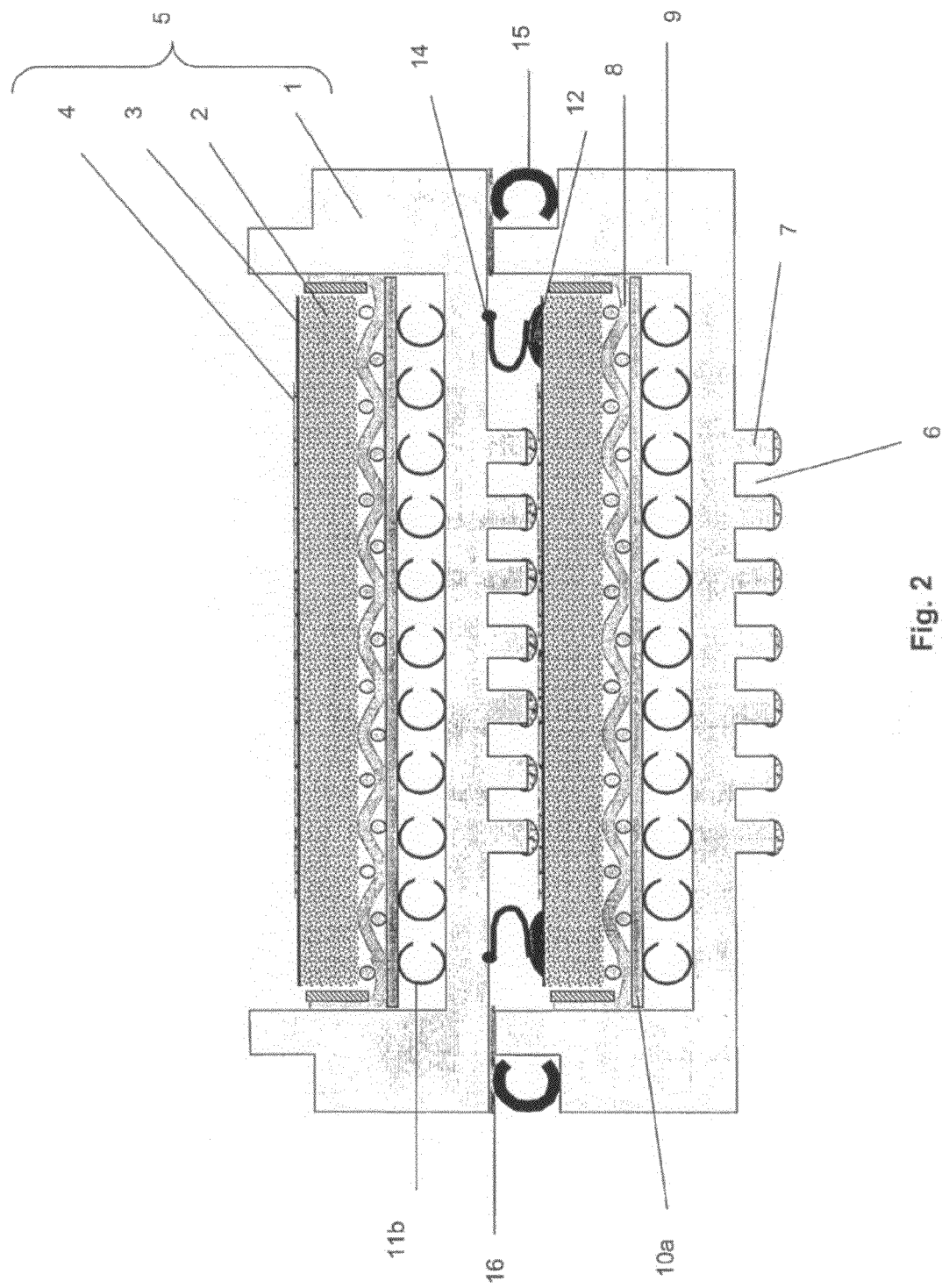
FIG. 2 shows a schematic cross-section through a stack of fuel cells that are connected to each other by means of the interconnectors 1 described in this invention, as well as the additional spring-loaded elements.

FIG. 2 shows a schematic cross-section through two fuel cells 5 each comprising an anode 2, cathode 4, and electrolyte 3, that are interconnected by means of the interconnectors 1 described in this invention. In addition to the device characteristics described in FIG. 1, the interconnectors 1 have additional spring-loaded elements 14 and 15.

The interior glass solder seal 12 can be provided with a further spring-loaded element 14 that is connected to the adjoining interconnector 1 and is able to compensate for the relative movements of the fuel cell. In order to seal the interconnectors 1 against each other, a spring-loaded metallic seal 15 can be employed that is not electrically insulated and is able to compensate for any relative movements at the edges of the interconnectors 1 that are connected to each other. In this case, the electrical insulation between the interconnectors 1 is achieved by means of ceramic layers 16 that are applied to the interconnectors 1 by means of plasma coatings, for example.

The invention claimed is:

1. A high-temperature fuel cell comprising:
an interconnector formed with side edges,
an anode received in the interconnector between the side edges,
at least one electroconductive agent electroconductively contacting the anode with the side edges of the interconnector, and
electrically nonconductive spring-loaded elements of mica between the anode and the interconnector for permitting relative movement therebetween.

2. The fuel cell according to claim 1 wherein the spring-loaded elements are comprised of individual elements having a circular, C-shaped or S-shaped cross-section, or of a spring-loaded layer or strip.

3. The fuel cell according to claim 1 wherein the electroconductive agent is comprised of nickel, gold, platinum or silver.

4. The fuel cell according to claim 1 wherein the electroconductive agent is electroconductively soldered onto the side edges of the interconnector, or is fitted into the side edges.

5. The fuel cell according to claim 1 wherein an interior glass solder seal is connected to the anode by means of a spring-loaded element.

6. The fuel cell according to claim 5 wherein the spring-loaded element is a mica strip.

7. The fuel cell according to claim 5 wherein the cross-section of the spring-loaded element takes the form of a circle, a C, or an S.

8. The fuel cell according to claim 5 wherein the side edges of the interconnector are in contact with the interconnector by spring-loaded, metallic seals.

* * * * *